UNITED STATES PATENT OFFICE.

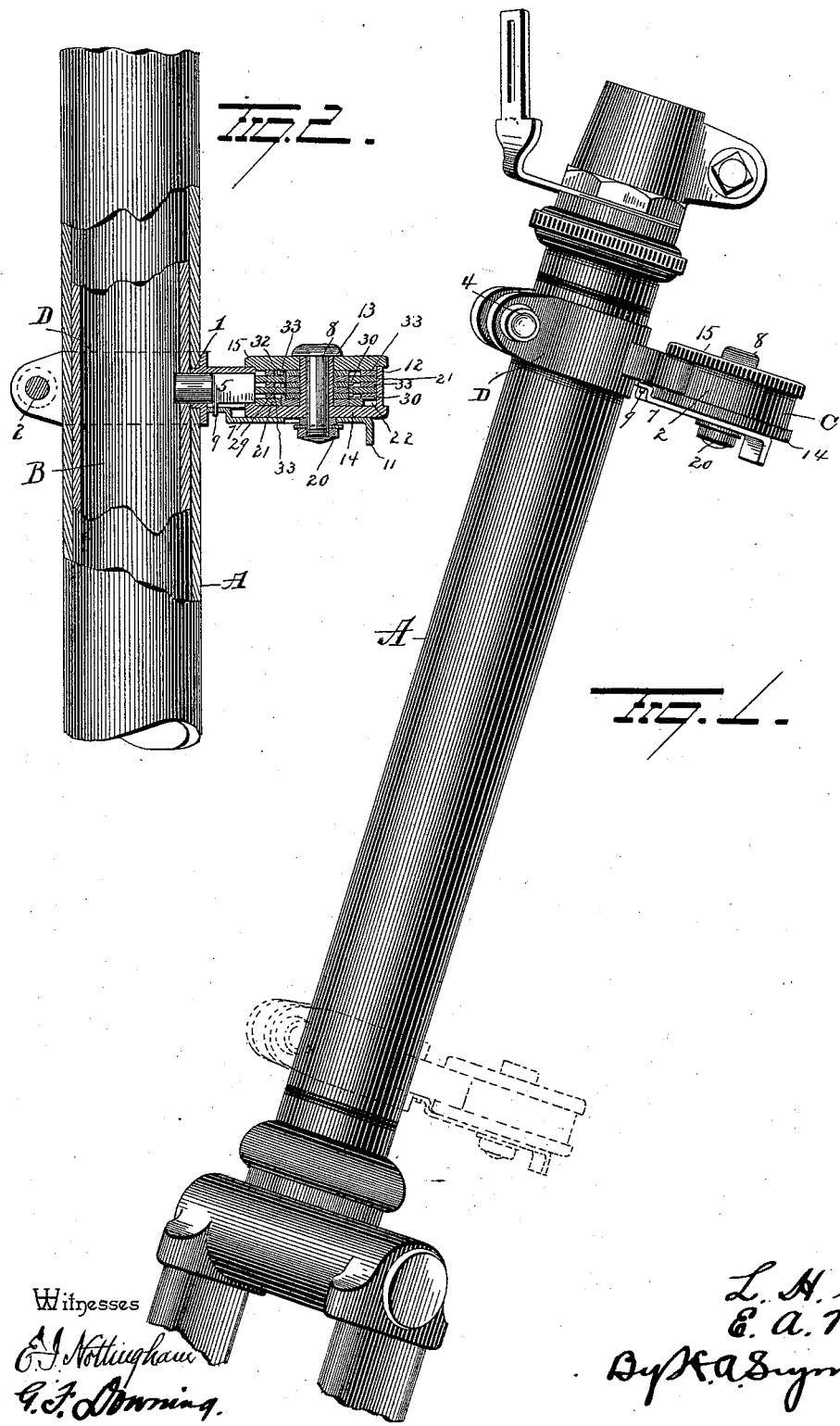

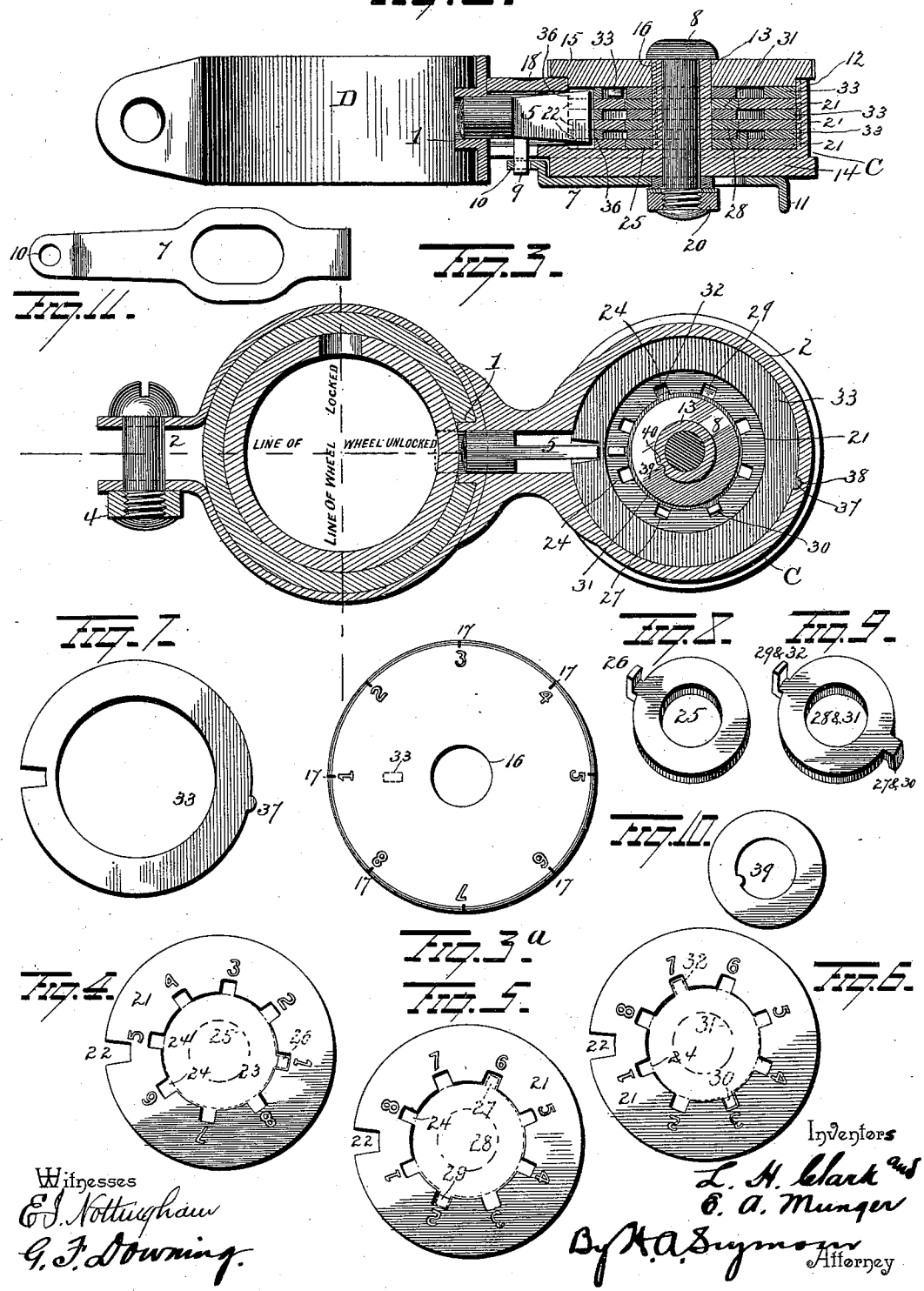

LOUIE H. CLARK AND ERNEST A. MUNGER, OF FOND DU LAC, WISCONSIN, ASSIGNORS TO WILLIAM T. ALLEN AND ARTHUR C. EWEN, OF BROOKLYN, NEW YORK.

BICYCLE-LOCK.

SPECIFICATION forming part of Letters Patent No. 568,743, dated October 6, 1896.

Application filed January 28, 1896. Serial No. 577,138. (No model.)

*To all whom it may concern:*

Be it known that we, LOUIE H. CLARK and ERNEST A. MUNGER, of Fond du Lac, State of Wisconsin, have invented certain new and useful Improvements in Bicycle-Locks; and we do hereby declare the following to be a full, clear, and exact description of the invention, such as will enable others skilled in the art to which it appertains to make and use the same.

Our invention relates to an improvement in combination-locks designed for various purposes where a bolt can be used, as on drawers, chests, and doors in general, and more particularly to be used on bicycles, it being applicable to various parts thereof, as the crank-hanger, the rear hub, or, as preferred and as shown in the drawings, to the head of the machine.

The object is to provide a simple lock which can be quickly operated and will be effectual in locking the parts, or more especially, when used on a bicycle, to preclude the possibility of its being stolen; and with this end in view it consists in certain novel features of construction and combinations of parts, which will be hereinafter described, and pointed out in the claims.

In the accompanying drawings, Figure 1 is a view showing our improved lock attached to the head of a bicycle. Fig. 2 is a vertical sectional view through the lock and bolt. Fig. 2ª is a similar view, enlarged. Fig. 3 is a horizontal sectional view. Fig. 3ª is a detached view of the dial. Figs. 4, 5, and 6 are views of the three tumblers used in the particular lock described. Fig. 7 is a view of one of the larger washers. The three used being just alike only one is shown. Figs. 8 and 9 are views of two forms of carriers. Fig. 10 is a view of one of the small washers 1, and Fig. 11 is a detached view of the bolt-sliding device.

As we have shown our lock attached to a bicycle only, it will be described in that connection.

A and B represent the outer and inner tubes, respectively, of a bicycle-head, the inner one being adapted to turn in the outer one in the usual manner in steering bicycles and the outer one constituting a part of the bicycle-frame.

C is the lock-case, and D is a split ring or clip for holding it in place upon the bicycle-head. The two are connected together by an integral web which joins both. The split ring or clip is made to surround the head. A boss 1 projects into the hole in the outer tube A to prevent the clip or ring from turning on the head or other part upon which it may be applied, and the ends are held together by a bolt, screw, or rivet 2 and preferably by a screw or bolt upon the end of which a round nut 4 is turned, after which the end of the screw or bolt is upset, so that the removal of the nut is practically impossible.

The slide-bolt 5 passes through the connecting-web, and it being longer than the web either one end or the other always protrudes either into the ring or clip or into the lock, as the case may be, when the machine is locked or unlocked, and when locked the bolt preferably extends into a hole in the inner tube B of the head around at one side of the center, so that to get it into position it is necessary to turn the fork way around axially, the object being to make it impossible to wheel the machine off. The slide-bolt can only be thrown into the lock when the tumblers are in position to receive it, and this is regulated by the combination which will be described presently. The bolt is conveniently thrown by the bolt-controlling slide 7, which in the form shown straddles and is guided by the bolt 8, which holds the parts of the lock together. One end of this slide is connected with the slide-bolt by means of a pin 9, projecting from the bolt into a hole 10 in the slide, and the other end or some part of this slide has a thumb projection 11, by means of which it is manipulated and controlled.

This much being understood we will now proceed to describe the mechanism of the lock, which it may be said in this connection may effectually be varied in number of parts, notches, &c.; but in the interest of clearness we will describe it just as we have shown it.

The lock-case comprises the outer barrel 12, the hollow post 13 at the center, and the bottom 14, with which the barrel and post are rigidly connected. Also there is a turn-dial 15, which forms the top. This dial may fit down into the barrel and has a central hole 16, which receives the post 13. The dial has notches 17 at the edge at proper intervals which are to register with a mark "18" on the web which connects the lock to the clip, and these several notches on the dial are numbered consecutively, as illustrated in this particular instance, from "1" to "8." The extreme edge of the dial is normally milled to facilitate its easy manipulation. The screw or bolt which passes down through the post and bottom and holds the dial in place has a round nut 20, screwed on its lower end, and the end is then upset so that its removal is practically impossible.

The mechanism of the lock is as follows: A rotary bottom tumbler 21, which just fits nicely in the barrel, is placed on the bottom of the lock-case. This tumbler has one notch 22 on the periphery, which, when thrown in position opposite the slide-bolt, will permit the bolt to be slid back into it, providing the other tumblers are all in the same position. This tumbler is provided with a central hole 23, and from this hole as many notches 24 (eight in this instance) are formed, equally distant from each other, as there are numbers on the dial, and these are consecutively numbered from "1" to "9" in reverse order. One of these notches would suffice to make up a combination, but as it is desirable that provision be made for a change of combination, if the exigency should require it, the several notches are provided to admit of this, as will be hereinafter explained. Within the central opening 23 of this tumbler a carrier 25 is introduced. This might be an integral part of the tumbler but for the desirability of the changes in combination. This carrier has a projection 26, projecting outwardly from its periphery to enter one of the notches 24, according to the set of the combination. This projection 26 also extends upwardly in position to be engaged by a corresponding downwardly-extending projection 27 on the next carrier above or middle carrier 28, which travels in the path of the projection 26. This second or central carrier is also provided with an upwardly-extending projection 29, which is in position to be struck by a downward projection 30 on the top carrier 31, and the top carrier is furnished with an upwardly-extending projection 32, lying in the path of a projection 33 on the inner face of the dial, so that these several tumblers are all turned by the movements of the dial and its depending projection 33, they being set from the bottom upward in turn and left where they are set in order until again scattered. As the tumblers are all alike only one has been described, and there is only one difference, and that being in the location of the notch 22. In the bottom tumbler it is situated between the notches numbered "5" and "6," whereas in the other two the notches are between numbers "1" and "8." Between each two tumblers the large washers 35 35 35 are placed. These washers have notches 36 therein to afford clearance for the bolt, and the washers are prevented from turning by a tooth 37, which enters the vertical groove 38 in the barrel. These three washers are just alike. Also there are three smaller washers interposed between the carriers. These also each have a tooth 39, which enters a groove 40 in the central hollow post. As the combination is now set the bottom carrier projection is in the notch "1" of the bottom tumbler, the upturned projection on the middle carrier is in notch "2" of the middle tumbler, and the upturned projection on the top carrier is in notch "3" of the top tumbler. This particular combination operates as follows to unlock: Turn the dial four times to the left to "1," then three times to the right to "2," and finally once to the left to "3." This throws the tumblers from the bottom to the top in consecutive order, placing each notch opposite the bolt. Then it is only necessary to slide the bolt back into the notches and the machine is unlocked. To lock it, the reverse takes place. The bolt is slid forward into the holes in the tubes A and B, they being first placed in alinement, and then the tumblers are scattered by turning the dial three or four times to the right and then to the left, or vice versa, or in any way to break the combination.

The combination can be changed by setting the carrier projections in different notches, the numbers on the tumblers opposite the notches being provided to make it easy and plain to set a combination, and it will be observed that the numbers to which the dial is turned to always correspond. For instance, if the bottom carrier projection is placed in notch "4" of the bottom tumbler, the dial will be turned to the left four times, as before, and stopped at "4." If the next one is in "6" the dial will be turned to the right three times, as before, and stopped at "6," and so on.

It is evident that slight changes in the number of parts employed or notches used or in the location or application of our lock could be made without deviating from the spirit and scope of our invention, and hence we do not wish to limit ourselves to the exact construction herein set forth; but, Having fully described our invention, what we claim as new, and desire to secure by Letters Patent, is—

1. The combination with the lock-case, of rotary tumblers having notched peripheries and notched interiors, carriers located in the central openings of the tumblers and occupying the same plane, said carriers each having a projection adapted to enter one of the internal notches and project beyond the face of the carrier, a rotary dial having a projection whereby to turn the carriers and then in turn the tumblers and a bolt, substantially as set forth.

2. The combination with a casing, circular tumblers having internal notches and a peripheral notch, a carrier located in the central opening of each tumbler and occupying the same plane, said carriers each provided with a peripheral projection which enters one of these notches and extends beyond the plane of the tumbler, of a rotary dial provided with a projection adapted to engage a tumbler projection whereby to throw the tumbler, a sliding bolt, and means for operating the slide-bolt, substantially as set forth.

3. The combination with a casing, a slide-bolt, and a slide connected with the bolt, said slide having an elongated slot, of a dial, rotary tumblers, a central bolt passing through the dial-tumblers, casing and slot in the slide and means for retaining the slide in place, substantially as set forth.

In testimony whereof we have signed this specification in the presence of two subscribing witnesses.

LOUIE H. CLARK.
ERNEST A. MUNGER.

Witnesses:
M. T. SIMMONS,
GEO. T. KINDER.